(12) United States Patent
Nelson, Jr. et al.

(10) Patent No.: US 8,344,721 B2
(45) Date of Patent: Jan. 1, 2013

(54) METHOD FOR LOCATING SUB-SURFACE NATURAL RESOURCES

(75) Inventors: H. Roice Nelson, Jr., Houston, TX (US); Joseph H. Roberts, Houston, TX (US); D. James Siebert, Katy, TX (US); Wulf F. Massell, Conroe, TX (US); Samuel D. LeRoy, Houston, TX (US); Leslie R. Denham, Houston, TX (US); Robert Ehrlich, Salt Lake City, UT (US); Richard L. Coons, Katy, TX (US)

(73) Assignee: Vaisala Oyj, Helsinki (FI)

( * ) Notice: Subject to any disclaimer, the term of this patent is extended or adjusted under 35 U.S.C. 154(b) by 391 days.

(21) Appl. No.: 12/655,810

(22) Filed: Jan. 7, 2010

(65) Prior Publication Data

US 2011/0163733 A1     Jul. 7, 2011

(51) Int. Cl.
*G01R 31/02* (2006.01)
*G01N 27/00* (2006.01)
*G01W 1/00* (2006.01)
(52) U.S. Cl. ............................. 324/72; 324/71.1; 702/4
(58) Field of Classification Search .................... 324/72, 324/71.1; 702/4
See application file for complete search history.

(56) References Cited

U.S. PATENT DOCUMENTS 5,417,282 A * 5/1995 Nix ............................. 166/248
2010/0023267 A1 * 1/2010 Karabin et al. .................. 702/4

* cited by examiner

*Primary Examiner* — Amy He
(74) *Attorney, Agent, or Firm* — Portland Intellectual Property, LLC

(57) ABSTRACT

A method for locating sub-surface natural resources. The method utilizes lightning data to discern relatively likely locations for finding the sub-surface natural resources.

16 Claims, 8 Drawing Sheets

METHOD FOR LOCATING SUB-SURFACE NATURAL RESOURCES

FIELD OF THE INVENTION

The present invention relates to methods for discovering the location of natural resources, such as minerals, water, oil and gas, beneath the surface of the earth.

BACKGROUND

Natural resources beneath the surface of the earth include oil, gas, water, minerals, and sources of geothermal energy. It is a primary need of an industrialized society to locate natural resources, yet sub-surface resources or deposits may be buried at significant depths and be difficult to find. Geologists and geophysicists are typically engaged in such searches, because the different types of resources are concentrated and distributed in special relationships to the structure of the earth. Particularly, sedimentary deposits may trap resources such as oil and gas, while faulting often provides a path for migration of such resources through the earth's crust, as well as a trap for trapping the resources. It is critical to understand the underlying geology to make, essentially, educated guesses as to where certain resources may be found, and therefore where to make the often enormous investment of drilling deep into the earth.

Processes used to explore for diamonds, other gemstones, gold, silver, copper, other minerals, geothermal deposits, oil, gas, water, and other sub-surface natural resources share inherent similarities.

The first step is to identify where on the earth there are known deposits of the resources of interest. Known deposits of sub-surface resources are correlated to specific age and type of geology. This often provides the first indication of what to look for when searching in other areas. Surface geologic maps are used to identify areas in which certain deposits are more likely to be found.

For example, the best diamond mines are found in kimberlite pipes, which connect rapid violent volcanic eruptions with anomalously enriched exotic mantle compositions derived from depths of 150 to 450 km. Surface geologic maps which show the location of potassic volcanic rocks provide the clues to finding kimberlite pipes.

As another example, porphyritic intrusive rocks and fluids accompanying the transition and cooling from magma to rocks are a primary source of copper, and also typically contain molybdenum, silver, and gold. Sulfide minerals, which are economically important as metal ores, as well as iron and nickel deposits are also formed by mantle intrusions. Surface geologic maps identify trends indicating where these more electrically conductive minerals may be found.

Hot water that can be used for geothermal energy production is found near tectonic plate boundaries, such as along the California coastline, and also near mantle derived intrusive rocks that have not completely cooled, such as in Yellowstone National Park.

Oil and gas deposits typically occur in sedimentary basins and are thought to originate from (1) source rocks that have been buried deep enough to generate the high pressures and temperatures needed to crack the organic rich rock, (2) reservoir rocks through which the hydrocarbons can migrate and in which the hydrocarbons may become stored, and (3) seal rocks that trap and keep the hydrocarbons from escaping into the atmosphere. Surface geologic maps identify the trends indicating where such structural and stratigraphic traps may be found.

As an example, sediments eroded from relatively high areas such as mountains are deposited in relatively low-lying areas such as river channels, lake beds, and off-shore on the sea floor, as essentially planar, horizontal layers. Where these layers contain economically important fluids such as water, oil, methane, carbon dioxide, or other natural gases, they are referred to as "reservoir rocks." Hot water may also be contained in a reservoir rock, where in this example the water is not economically important as a fluid, but as a stored source of geothermal energy.

Tectonic plate activity can deform these reservoir rocks and force them out of planarity, by distorting them into ridge forms referred to as anticlines that, by rising and dipping, provide pockets for entombing the natural resources stored therein. It is very common to find water in reservoir rocks, with oil above the water and gas above the oil, each fluid layer separated from the fluid below depending on relative fluid density, with all fluid layers being trapped by the anticline.

The tectonic activity may also create cracks or faults in the reservoir rocks, and as the fault blocks move on either side of a crack or fault they grind together, producing fine particles that act as a seal. Thus a fault line or crack can also act in the manner of an anticline to trap the natural resources of any reservoir rocks therein.

Tectonic activity and faults are also related to natural resources other than oil and gas. For example, faults can provide paths for the flow of hot fluids from the hotter depths of the earth, the fluids carrying minerals in solution, upwardly toward the cooler surface of the earth, the minerals crystallizing along the way at different elevations depending on temperature. Deep seated "transform faults" may carry important mineral resources, such as gold, lead, silver, zinc, and copper, up from the mantle.

These examples show, as is otherwise readily understood by geologists and geophysicists, that important natural resources are associated with particular types of geology.

Maps of topography, soils, vegetation, and water table are also useful for identifying sub-surface geology, and satellite imagery can identify patterns in soils and vegetation which relate to sub-surface geology.

Once a search area is identified by use of maps, site specific data are collected. Oil seeps, natural gas seeps, pockmarks or mud volcanoes, and reefs growing on sub-sea expressions of fault scarps may provide direct evidence of oil or gas deposits. However, the best data are typically obtained from well cores and cuttings. Cores and cuttings are studied in laboratories to determine pore size, porosity, permeability, mineralogy, lithologies, fluid content, paleo-fossils, etc. Well data are extensively used to map out sub-surface mineral deposits before starting an open pit mine or sinking shafts.

In oil and gas exploration there are numerous well logging devices that measure physical properties of the rocks adjacent to the well bore, which are critical to exploration. Such devices collect data, which are used to generate sub-surface maps of geologic horizons, lithologies, and fluids. Important measurements made with these logging devices include spontaneous potential ("SP") and resistivity. SP logs measure the effect of telluric currents in a borehole that vary with salinity differences between the formation water and the borehole mud filtrate, and indicate permeable beds (e.g., sands and dolomites) and impermeable beds (e.g., shales and salts).

Resistivity logs measure the bulk resistivity of a formation, which is a function of porosity and pore fluid. Porous rock containing conductive saline water will of course have a lower resistivity, whereas non-porous rock or hydrocarbon filled formations have a relatively high resistivity.

Geophysical exploration makes use of a wide variety of measurement devices, such as for measuring outgassing, soil chemistry, gravity fields, electromagnetic fields, and earthquake activity, and devices used to generate and record seismic energy used to image the sub-surface.

For many years, oil and gas prospects have been evaluated with 2-D or 3-D seismic surveys. Seismologists have developed sophisticated seismic acquisition, processing and visualization tools for the prediction of lithologies and fluids from seismic reflection and refraction data.

Electromagnetic tools are used to measure and infer the electrical properties of soils and shallow bedrock, and to identify electrical conductivity contrasts between geological units. VLF methods use "back pack" portable instruments to measure local perturbations in the very low frequency (15-30 kHz) radio signals generated by the world-wide radio transmitters designed and used for submarine communications. The technique has been used for fault mapping, groundwater investigations, overburden mapping, contaminant mapping, and mineral exploration. "CSEM," or "controlled source electromagnetics," is another electromagnetic tool that is used in marine environments to measure the electrical resistivity associated with the presence of oil and gas.

All of these techniques are indirect tools used to infer what may lie underground, since the sub-surface cannot be directly tested without physical penetration. However, all are imperfect, and so a number of different types of techniques and tools are used in conjunction, the more so as people must search for natural resources that are becoming increasingly difficult to find. There is, therefore, always a need for another method for locating sub-surface natural resources, and there is especially a need for such a method that produces better results as presented herein.

SUMMARY

Methods for locating sub-surface natural resources are disclosed herein. A basic method makes use of a lightning database having lightning data for each of a plurality of lightning strikes. The lightning data include, for each of the plurality of lightning strikes, one or more respective lightning parameters A determined for the lightning strike, and at least one respective location B determined for the lightning strike. The lightning data are subject to a filtration step that includes selecting a sub-set of the plurality of lightning strikes. The step of selecting in turn includes a step of comparing, for each of the plurality of lightning strikes, the corresponding one or more lightning parameters A of the lightning strike with either or both (1) the corresponding one or more lightning parameters A associated with those other lightning strikes of the plurality of lightning strikes that are remaining, and (2) one or more standards of comparison. For each of the lightning strikes of the sub-set, the corresponding locations B are identified, and the lightning strikes of the sub-set are associated with the corresponding locations B to define a mapped area. The method further includes determining, for at least one first geographical area associated with the mapped area, one or more first measures relating to one or more of (1) a quantity of the lightning strikes of the sub-set falling within the at least one first geographical area, and (2) one or more of the lightning parameters A associated with the lightning strikes of the sub-set falling within the at least one first geographical area. The basic method still further includes identifying the at least one first geographical area as corresponding to at least one target geographical area associated with which the natural resource is relatively likely to be found, at least in part, as a result of determining that the one or more first measures is significant.

In addition to the steps of the basic method, the following sub-methods are preferably performed in conjunction therewith, separately or in any desired combination or sub-combination:

Preferably, the step of determining that the one or more first measures is significant includes comparing the one or more first measures to one or more corresponding significance standards. More specifically, the step of determining that the one or more first measures is significant preferably includes determining that the one or more first measures either exceeds a first significance standard or falls below a second significance standard.

Preferably, the method includes determining, for at least one second geographical area distinct from the at least one first geographical area, one or more second measures relating to one or more of (1) a quantity of the lightning strikes of the sub-set falling within the at least one second geographical area, and (2) one or more of the lightning parameters A associated with the lightning strikes of the sub-set falling within the at least one second geographical area. More preferably, the one or more significance standards are determined at least in part by the result of determining the one or more second measures.

Preferably, the one or more significance standards is predetermined.

Preferably, the step of comparing includes comparing, for each of the plurality of lightning strikes, the corresponding lightning parameter A with the lightning parameters A associated with the remaining others of the plurality of lightning strikes.

Preferably, the one or more lightning parameters A include at least one of A1, a date associated with the lightning strike; A2, a time associated with the lightning strike; A3, a latitude associated with the lightning strike; A4, a longitude associated with the lightning strike; A5, a peak current associated with the lightning strike; A6, a Chi-square associated with the lightning strike; A7, a semi-major axis associated with the lightning strike; A8, a semi-minor axis associated with the lightning strike; A9, a rise time associated with the lightning strike; A10, a peak-to-zero time associated with the lightning strike; A11, a number of lightning sensors associated with the lightning strike; and A12, a polarity associated with the lightning strike. More preferably, the one or more lightning parameters A include A5.

Preferably, the step of selecting the sub-set includes associating, with each of the plurality of lightning strikes, respective contemporaneous occurrences of one or more physical phenomena, and choosing at least some of the lightning strikes for the sub-set at least in part as a result of these occurrences. More preferably, the one or more physical phenomena include at least one of high earth tide, low earth tide, high sunspot activity, low sunspot activity, high solar wind activity, and low solar wind activity.

Preferably, a plurality of geographical cells within a geographical area that contains the locations B are defined, and, for the lightning strikes occurring within each cell, the corresponding one or more first measures are aggregated. More preferably, the first step of determining includes determining a quantitative representation of the lightning strikes in at least one of the cells, and wherein the step of identifying includes comparing the quantitative representation to at least one corresponding quantitative standard.

The lightning parameters A may be determined by a polytopic vector analysis (PVA) which produces "hybrid" lightning parameters that are mathematically optimized mixtures of the lightning parameters that can be directly obtained from the lightning database.

A second method is disclosed for characterizing sub-surface geology that is either itself a natural resource, or that is associated with a natural resource. The second method also makes use of a lightning database having lightning data including, for at least a first selected lightning strike, at least one representation A1 of an electric current amplitude of the first lightning strike versus time, defining a first current waveform for the first lightning strike, and at least one first location B1 determined for the first lightning strike. At least one of (1) first well log data and (2) first seismic data corresponding to the at least one first location B1 is provided. A step of inverting a first representative waveform derived, at least in part, from the first current waveform is performed, including utilizing the at least one of the data types (1) and (2) as a guide, thereby obtaining a first lightning resistivity trace.

The second method may be used in conjunction with the basic method and any of the aforementioned sub-methods to provide additional qualitative or quantitative insight into the sub-surface natural resources. Moreover, the following sub-methods are preferably performed in conjunction with the second method, separately or in any desired combination or sub-combination:

Preferably, the method includes comparing the first lightning resistivity trace with a comparable type of control data obtained for sub-surface geology associated with a control geographical area. The sub-surface geology associated with the control geographical area preferably has at least one characteristic that is either known or assumed. The first lightning resistivity trace is compared with the control data to determine if the two are sufficiently similar. If the two are found to be sufficiently similar, the method further includes inferring a similarity between the sub-surface geology associated with the target geographical area and the sub-surface geology associated with the control geographical area.

Preferably, where the type (1) or type (2) data are indicative of the geology at a control location, the step of determining whether the type (1) or type (2) data correspond to the at least one first location B1 includes determining whether there is a sufficient geological nexus between the control location and the at least one first location B1. More preferably, the step of determining whether there is a sufficient geological nexus between the control location and the at least one first location B1 includes determining either (1) that the control location is sufficiently proximate the at least one first location B1, or (2) that the control location has a sub-surface geology that is sufficiently comparable to that of the at least one first location B1.

Preferably, the lightning data include, for at least a second selected lightning strike, at least one representation A2 of an electric current amplitude of the second lightning strike versus time, a second current waveform for the second lightning strike is defined, and at least one second location B2 is determined for the second lightning strike, wherein the representative waveform is derived, at least in part, by stacking the first and second waveforms. More preferably, the method includes determining whether there is a sufficient geological nexus between the at least one first location B1 and the at least one second location B2 as a condition for deriving the representative waveform, at least in part, by the stacking of the waveforms.

Preferably, where the lightning data include, for at least a second selected lightning strike, at least one representation A2 of an electric current amplitude of the second lightning strike versus time, a second current waveform for the second lightning strike is defined, and at least one second location B2 is determined for the second lightning strike, the method includes providing at least one of (3) second well log data and (4) second seismic data corresponding to the at least one second location B2, and inverting a second representative waveform derived, at least in part, from the second current waveform including utilizing the at least one of the data types (3) and (4) as a guide to form a second lightning resistivity trace for the second location B2, and combining the first and second lightning resistivity traces so as to define a 2-D cross-section of the sub-surface.

To define a 3-D volume of the sub-surface, the lightning data include, for at least a third selected lightning strike, at least one representation A3 of the current amplitude of the third lightning strike versus time, and the method includes defining a third current waveform for the third lightning strike, and at least one third location B3 determined for the third lightning strike, providing at least one of (5) third well log data and (6) third seismic data corresponding to the at least one third location B3, and inverting a third representative waveform derived, at least in part, from the third current waveform including utilizing the at least one of the data types (5) and (6) as a guide to form a third lightning resistivity trace for the location B3. The first, second, and third lightning resistivity traces are combined.

A preferred use of the characterization methodologies is to utilize the LRT's, LRT cross-sections, and LRT volumes to discern, respectively, the depth, the lineal and the volumetric extent of the sub-surface geology, based on interpretation that includes comparison with comparable data, obtained either for the one or more areas associated with the LRT's, LRT cross-sections, and LRT volumes, or for one or more other areas having a sufficient geological nexus therewith or similarity thereto.

All of the processes and methods summarized above are preferably performed on a specially programmed general purpose computer.

Typically, as a consequence of identifying a target geographical area, or characterizing sub-surface geology associated with an area, according to any of the above methodologies, an action is taken with respect to the area such as any of those described herein. Most typically, the earth is invaded, such as by excavating or mining to extract the natural resources, at a location determined, at least in part, by the target geographical area.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 1:
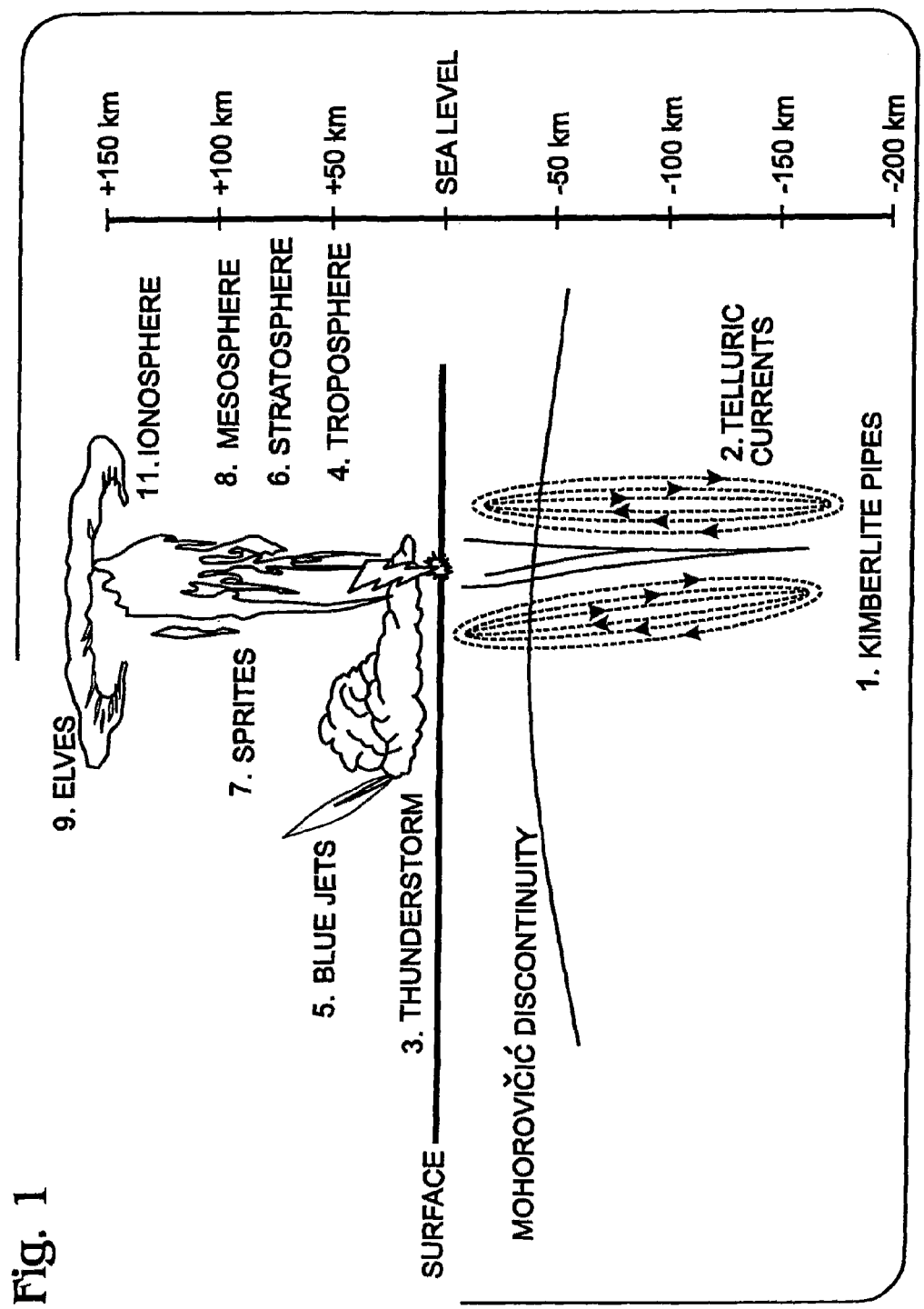
FIG. 1 is a schematic view of a lightning phenomenon and its interaction with the earth.

The present inventors recognized, and have been able to demonstrate, that lightning preferentially strikes the earth at geographical locations on the surface of the earth, and over geographical portions of the ocean near the shoreline (typically with underwater depths of 100 m or less), directly underneath which or otherwise associated with which there are either unusually large or unusually small telluric currents. The inventors have further recognized that deviations in telluric current from the norm that are of sufficient magnitude to permit a useful correlation between lightning strikes and important natural resources are generally present within certain categorical groups of geological features. Thus methods according to the invention are based on recognizing correlations between lightning strikes over a given geographical area and the sub-surface geology of the same area. The physical basis for this understanding will next be described.

The earth and its atmosphere acts as a capacitor, and lightning discharges are essentially capacitive discharges. The lower atmosphere acts as a dielectric between the two "plates" that store electrical charge. One of these "plates" is the outer atmosphere, particularly the ionosphere, which becomes charged through interaction with the solar wind. The other of these "plates" is the earth itself.

Clouds allow for discharges in this capacitive system that would otherwise not occur. Cloud-to-cloud lightning is first produced, and may never strike the earth. And cloud-to-cloud lightning can travel hundreds of kilometers through the atmosphere before finding a preferential path to ground so as to become a cloud-to-ground strike.

Though the strike is perceived to terminate at the surface of the earth, the earth "plate" of the earth/atmosphere capacitor comprises not just the surface but the sub-surface as well. In particular, there are lightning discharges to the ground that are of particularly high energy. These lightning discharges are believed to extend higher into the atmosphere than the level of the clouds, to create what are known as Blue Jets reaching into the Stratosphere, Sprites that reach into the Mesosphere, and Elves which can reach into the Ionosphere.

It is also believed that these discharges extend deeply into the earth, possibly substantially as deeply into the earth as they extend vertically into the atmosphere. This provides a physical connection to telluric currents, because the electrical properties of the earth at depth are both reflected in, and indicated by, telluric currents.

Telluric currents are moving electrical charges in the crust or mantle of the earth. The earth may produce such electrical charges as a result of chemical reactions, mechanical stresses, and relative movements of rocks and fluids, including magma and water. Telluric currents are thus related to sub-surface geology, a term which will be understood for purposes herein to refer to any geological structure or material beneath the surface of the soil, generally including both rocks and liquid and gaseous fluids. Importantly for purposes herein, telluric currents are related to sub-surface geology that is either itself an important natural resource, such as water, geothermal fluids, oil, gas, minerals, lithologies containing gems, etc., or is otherwise associated with an important natural resource.

It may then be noted that lightning tends to strike trees. It is often simply assumed this is because trees are typically the tallest objects in an area struck by lightning. But the present inventors have recognized that trees have root systems that are electrically connected to sub-surface soils and water tables through which flow telluric currents. The trees are low conductivity paths between the atmosphere and telluric currents. Accordingly, trees may be susceptible to being struck by lightning even if they are not the tallest objects in an area.

Sub-surface geologies may themselves produce telluric currents, or they may interact with existing telluric currents in somewhat characteristic ways. As an example of the former, minerals in the sub-surface can chemically react to create what is essentially an electrolytic battery or cell. Over large volumes, and where electrical conductivity that might bleed off the stored charges is poor, this can be responsible for building up the tremendous charge related to very high energy lightning strikes. As another example, deformation of non-conductive mineral grains or electrolyte-filled capillaries can occur at critical values of mechanical stress, producing natural electrical discharges.

More typically, sub-surface geologies interact with existing telluric currents, either by preferentially conducting or preferentially resisting the flow of the currents through the earth. For example, intrusive magma or hydrothermal fluids create alternative, lower resistance current conducting pathways that preferentially conduct telluric currents. Vertically oriented fault planes may be barriers to horizontal telluric current flow, though they may be provide vertically oriented, preferentially conductive paths, such as where an abundance of electrically conductive fluids, such as brines, are present. It is known that pressure also affects electrical conductivity (higher pressure reducing the conductivity), and that oil and gas, being relatively non-conductive, may preferentially resist the flow of telluric currents.

FIG. 1 shows volcanic pipes 1 that assist in the generation and/or conduction of telluric currents 2. The telluric currents electrically interact with thunderstorms 3 in the Troposphere 4, and as a result may actually create Blue Jets 5 in the Stratosphere 6, Sprites 7 in the Mesosphere 8, or Elves 9 reaching into the Ionosphere 11. In any event, the electrical discharges produce leaders for the lightning, attracting the strike, increasing both the likelihood of a strike and the strength of the strike.

Alternatively, conductive pipes, or mineral alteration adjacent to the pipes, or in faulting associated with the pipes, or in faulting more generally, may bleed off electrical charge before it has a chance to build up to such a high degree, resulting in a relative absence of lightning strikes. Either alternative relates to the electrical properties of sub-surface geology generally, and specifically to local geology associated with important natural resources.

Water is a particularly important and qualitatively unique actor in the connection between lightning and telluric currents, as well as being an important natural resource in its own right, particularly because it serves as a conductive path with a conductivity that is widely variable depending on (1) the impurities and ions such as sodium and chloride in the water, (2) the rocks or minerals around which the water flows, and (3) the phase of the water, which depends on temperature and pressure.

Based on the aforementioned connections between cloud-to-ground lightning and sub-surface geology, methods according to the present invention for locating sub-surface natural resources make use of a "lightning database," which is defined for purposes herein as any database containing lightning related data. The data in the lightning database are obtained from a lightning detection and data collection network 10. A preferred form of the network 10 for use in the continental United States is that known as the NLDN and marketed under the trademark NATIONAL LIGHTNING DETECTION NETWORK® by Vaisala, Inc., a Delaware, U.S.A. corporation. Many nation states have public source lightning detection networks, and other commercial enterprises may have, or develop, proprietary networks that can be used to provide all or part of the lightning database. So the lightning database may be obtained from any desired source, and the source may be a primary or original source or not. The lightning database is also typically an archive of historical data; however, it may include real-time data.

Figure 2:
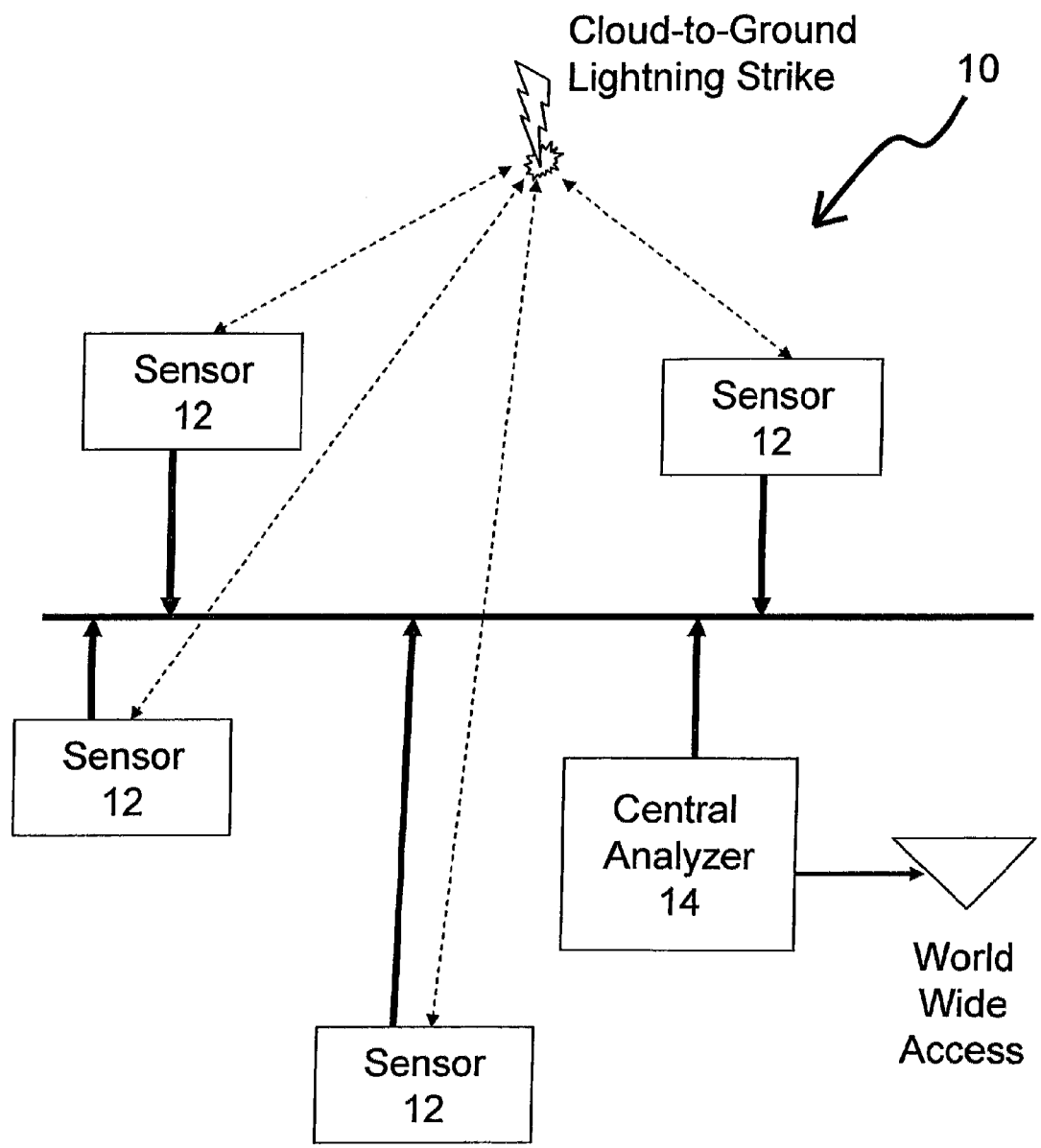
FIG. 2 is a schematic view of an existing lightning detection and data collection network used for collecting data for use in the present invention.

The preferred lightning detection and data collection network 10 is shown in FIG. 2. The network 10 includes a plurality of remote lightning sensors 12 distributed over the surface of the earth. Each sensor includes an antenna for receiving the electromagnetic signal produced by a given lightning strike that is within reception distance.

The sensors separately measure or otherwise discern certain parameters associated with the lightning strike, generally including date of the strike (gmt), time of the strike (gmt), distance between the strike and the sensor, direction of the strike relative to the sensor, peak current, polarity, rise-time, and peak-to-zero time. The sensors may also record the amplitude of the current of the lightning strike as a function of time, as a "waveform record."

Each sensor is adapted to report the lightning parameters as data to a "central analyzer" 14 that serves the sensors 12. Additional refinement of the data, based on accumulating the information received from several sensors, typically occurs at the central analyzer.

Figure 3:
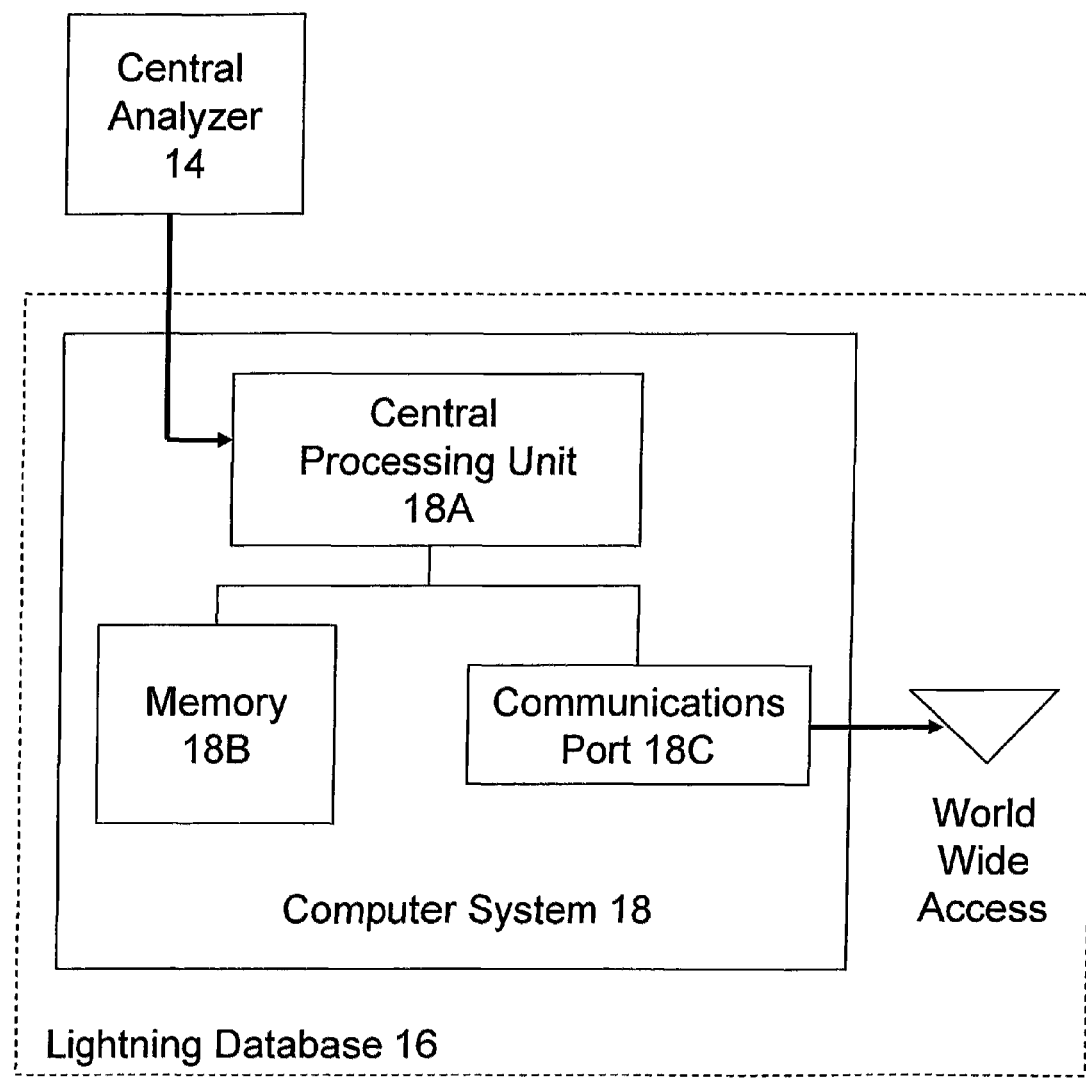
FIG. 3 is a block diagram of a computer and associated lightning database for use with the present invention.

FIG. 3 shows the lightning database, here referenced as 16. The database 16 is maintained in a computer or computer system 18 that includes a central processing unit 18a, a memory 18b, and a communications port 18c for communicating with the central analyzer and receiving data therefrom. Either the communications port 18c, or a second communications port (not shown) is used for communicating with users seeking to access the database. Preferably, the communications port 18c or the second communications port is connected to the Internet for this purpose, to facilitate world-wide access.

Figure 4:
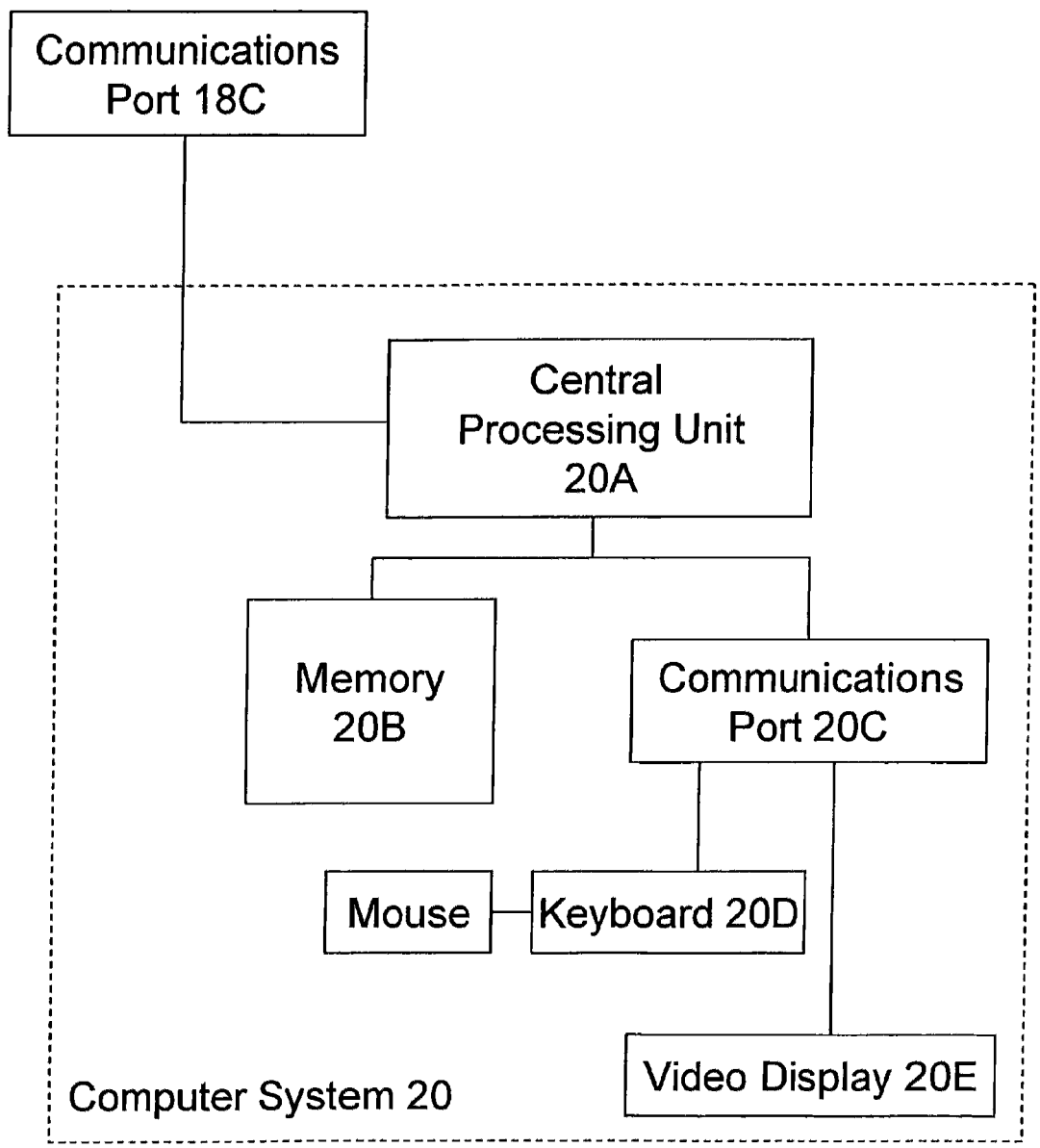
FIG. 4 is a block diagram of a computer used to carry out methods according to the present invention.

Referring to FIG. 4, a second computer or computer system 20 is assumed to be remotely available to a user of the database. The computer 20 includes a central processing unit 20a, a memory 20b, and a communications port 20c which is connected to the communications port 18c for communicating with the computer 18, particularly, the lightning database, for downloading the database, or selected portions thereof.

The computer 20 typically includes an input device 20d, such as a mouse and keyboard, to receive user instructions for selecting and manipulating the data obtained from the computer 18 according to methods described herein, and an output device 20e, such as a video display for viewing such data and manipulated versions thereof.

As will be apparent, the data acquisition and processing methods described herein can be and preferably are performed on a specially programmed general purpose computer, such as the computer 20. These methods can alternatively be performed on a special purpose machine or data processing apparatus, or any desired combination of a general and special purpose machine; however, it will also be appreciated that machine implementation is not essential.

As mentioned above, the lightning database contains lightning related data. The database 10 preferably contains the following data (or parameters) associated a given lightning strike: A1, a date associated with the lightning strike; A2, a time associated with the lightning strike; A3, a latitude associated with the lightning strike; A4, a longitude associated with the lightning strike; A5, a peak current associated with the lightning strike (preferably, more specifically, the magnitude of the peak current); A6, a Chi-square measure associated with the lightning strike; A7, a semi-major axis associated with the lightning strike; A8, an azimuth associated with the semi-major axis; A9, a semi-minor axis associated with the lightning strike; A10, an azimuth associated with the semi-minor axis; A11, a rise time associated with the lightning strike; A12, a peak-to-zero time associated with the lightning strike; A13, a number of lightning sensors associated with the lightning strike; and A14, a polarity associated with the lightning strike. The database also preferably contains a waveform record of the lightning strike, as discussed below. While it is preferred that the database include all of the above-mentioned parameters for each lightning strike processed by the network 10, the database may contain more or fewer parameters.

As mentioned above, the present inventors have recognized that telluric currents of sufficient magnitude to permit a useful correlation between lightning strikes and sub-surface geologies that either are themselves important natural resources, or are associated with important natural resources, are generally in the following categorical groups:

1) Volcanic Pipes (kimberlite pipes, lamproite pipes, and the Udachnya pipe)
2) Volcanic Rocks
3) Intrusive Ores
4) Salt Domes
5) Basement Shear Zones
6) Faults
7) Stratigraphy
8) Water
9) Geopressure Barriers
10) Fluids (other than water)
11) Oil and Gas Fields
12) Mud Volcanoes and Seeps
13) Coal Bed Methane
14) Reefs and Bioherms The inventors have determined that, to allow for making useful correlations between lightning strikes and the commercially significant sub-surface geologies mentioned above, lightning data must be processed or filtered in particular ways. In particular, methods according to the invention filter lightning data obtained from the database 16 in at least one of two ways: (1) by selecting a sub-set of the lightning strikes represented in the database based on selected criteria ("reduction") and/or (2) by aggregating at least a sub-set of the lightning strikes into cells ("aggregation") and comparing lightning data between cells rather than within the cells.

Before proceeding to a description of the methodologies (1) and (2), it may be noted that the lightning database is typically not consistent over time. That is, lightning strikes may not have been associated with all of the aforementioned parameters, or the same parameters, during two different periods of time, and moreover, the parameters may not have been measured the same way, or with the same accuracy, during the different periods. Therefore, it may be necessary before beginning to apply methods according to the invention to select from the database a sub-set of data that are comparable in relevant respects. The process of reducing the data set for the purpose of removing what are believed to be unreliable or incomparable data is referred to herein as "cleaning the data." It is also sometimes desirable to "normalize" or scale the data. Cleaning and normalizing are considered pre-processing steps that for purposes herein will be assumed to have been performed on the data to the extent desired before application of methodologies according to the invention.

Filtration (methodology (1) above) is performed by reducing the lightning data to create a first sub-set of the data, the data of the first sub-set being selected specifically for relevance to natural resource exploration according to the invention.

The most effective manner of such reduction that has been determined to date is to select from the database only those lightning strikes for which the absolute value of the peak current associated with the lightning strike is relatively high compared to the absolute values of the peak currents associated with the remaining lightning strikes. It has been found most effective to require of a lightning strike selected for the sub-set that its peak current is within the top 10% of the peak currents for all the lightning strikes, and thereby to reject the remaining 90% of the data. However, reasonably good results have been obtained where only about 50% of the data are rejected on this criterion. In general, the greater the percentage reduction, the better the results up to a point, that point being where there is a statistically insignificant amount of data remaining.

Figure 5:
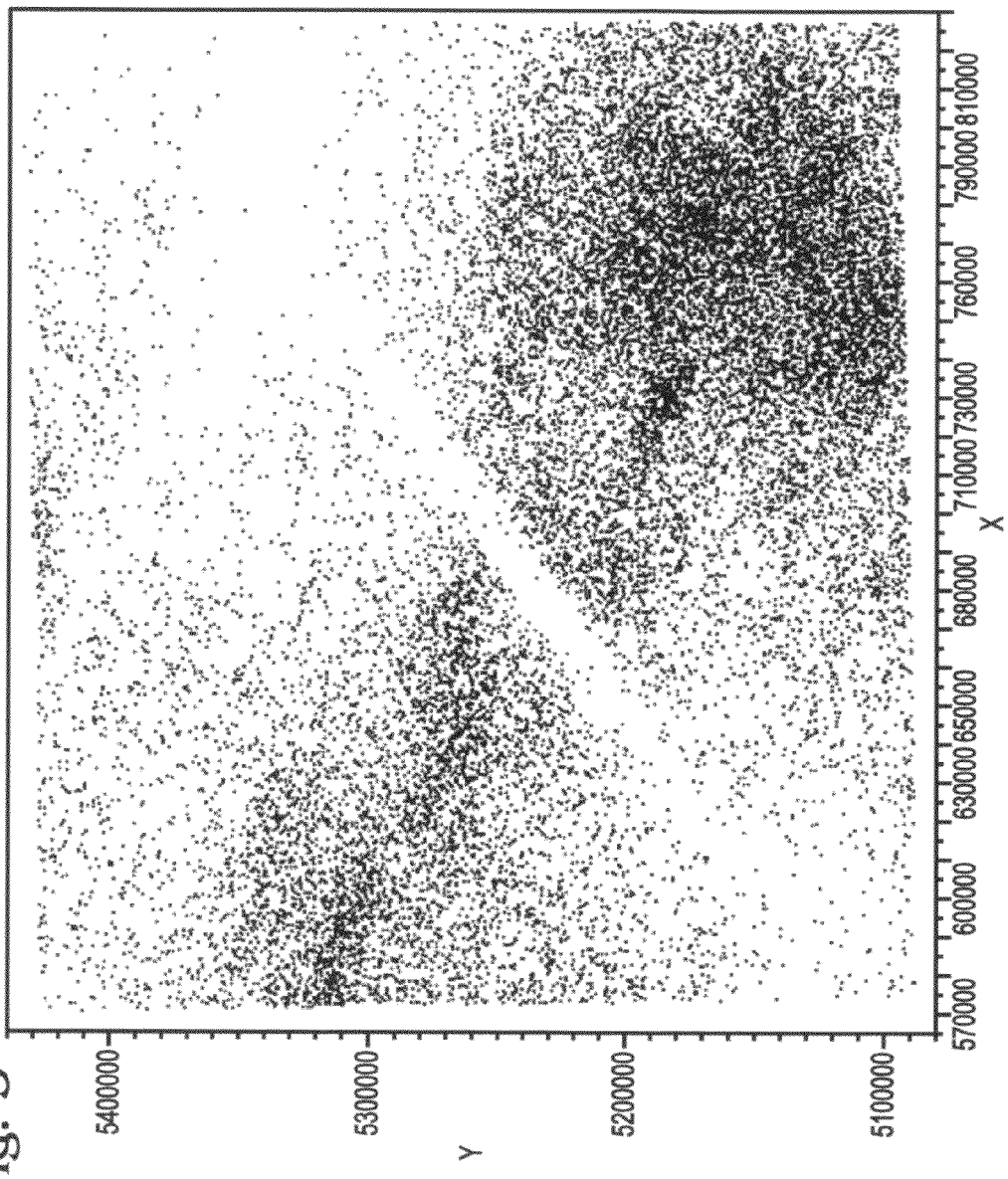
FIG. 5 is a map of lightning strikes obtained by a reduction methodology according to the invention.

Once the lightning strikes of interest are identified, they are mapped. That is, a selected lightning strike is associated with its location. An example is shown in FIG. 5, showing points corresponding to the lightning strikes found to be in the top quartile of the absolute value of peak current drawn at the associated locations of the strikes.

As in this example, mapping may be performed in the traditional sense of plotting a point corresponding to the location of the lightning strike relative to dimensional axes (e.g., x and y, or latitude and longitude), on sheet of paper or on a visually perceptible display suitable for human recognition. The present inventors have noted that areas of unusually high, or unusually low, strike density can be seen in such a map. However, since methods according to the invention are preferably performed in a computer, it is not essential to produce a human perceptible map, and it is to be understood that, therefore, that the terms "map" and "mapping" for purposes herein are broad terms, encompassing any recorded association between lightning data pertaining to a given lightning strike and the location of the given lightning strike.

In the reduction methodology (1) as well as in the aggregation methodology (2) discussed below, an objective is to identify the mapped area, or more preferably areas within the mapped area, as being significant based on one or more of the following measures: (i) strike density, e.g., the number of points within the area; (ii) one or more parameters associated with the lightning strikes in the area; or (iii) one or more mathematically defined or derived combinations or functions of factors (i) and/or (ii).

According to the invention, significant deviations in any of the above measures are identified and assessed to be associated with significant deviations in telluric currents underneath the area that foretell the presence of important associated sub-surface natural resources. These resources are typically found to lie underneath the identified areas, within their boundaries, but it should be understood that this is not always so. For example, a sub-surface geological feature may run underneath and affect lightning distributions in several areas. Generally, however, there is a geological connection between an area identified as being significant for purposes of locating the resources, and areas underneath which the resources are ultimately found.

In both methodologies (1) and (2), the preferred measure for use in making such identifications is simply the density of the lightning strikes within the area. More particularly, an area is identified as being significant it has associated therewith either (a) relatively or significantly higher densities of points, or (b) relatively or significantly lower densities of points. Such areas may be identified by use of a sliding window technique or filter, in which a window of predetermined or otherwise selected dimensions is moved over (across and/or down) the map (e.g., as a raster scan), and the density of strikes within the window is calculated for each new position of the window. If the density of strikes determined for any particular window position either exceeds a threshold, or falls below a threshold, the window is assessed to cover a geographical area associated with an important sub-surface natural resource.

The size of the sliding window is generally defined by the size and, sometimes, the geometry of the anticipated geophysical structures anticipated to be associated with the natural resource being explored. It is desired to have cell sizes that are small enough to allow the necessary resolution to distinguish between lightning strike activity in areas associated with such structures and lightning strike activity associated with other areas not associated with such structures. On the other hand, it is desired to have cell sizes that are large enough to discern the significance of the lightning data associated with a given cell. Geometry can enter into the determination of cell size because cells are typically rectangular and may not have dimensions that correlate well to the dimensions of the sub-surface geology. For example, sub-surface reservoir sand deposits from ancient river channels are elongate and it would be beneficial to choose cells, when searching for natural resources associated with such structures, which have dimensions that are not significantly larger than the narrowest dimension of the river channel. Of course, generally, cells need not be rectangular, and it is also not essential that cells "tile" the area to be searched.

An area to be searched could alternatively be divided into static cells of like size and shape in the manner described below in the context of aggregation.

Whether there is a significant deviation in the lightning data, such as a relatively high or low density of strikes within a window, is determined by comparison with one or more appropriately determined thresholds. For example, for evaluating the significance of a strike density within a window, the strike density may be compared to a threshold that is obtained by evaluating how the strike density varies within the mapped area, and is therefore determined by taking account of the average strike density and its actual variation. Alternatively, the threshold(s) can be determined by reference to one or more standards.

As has been suggested, one way of defining what is significantly high or low is by the use of standard statistical techniques. For example, assuming strike density follows a normal distribution, a significantly unusual strike density may be identified as being at least a given number, e.g., three, of standard deviations above or below a mean level of strike density.

Figure 6:
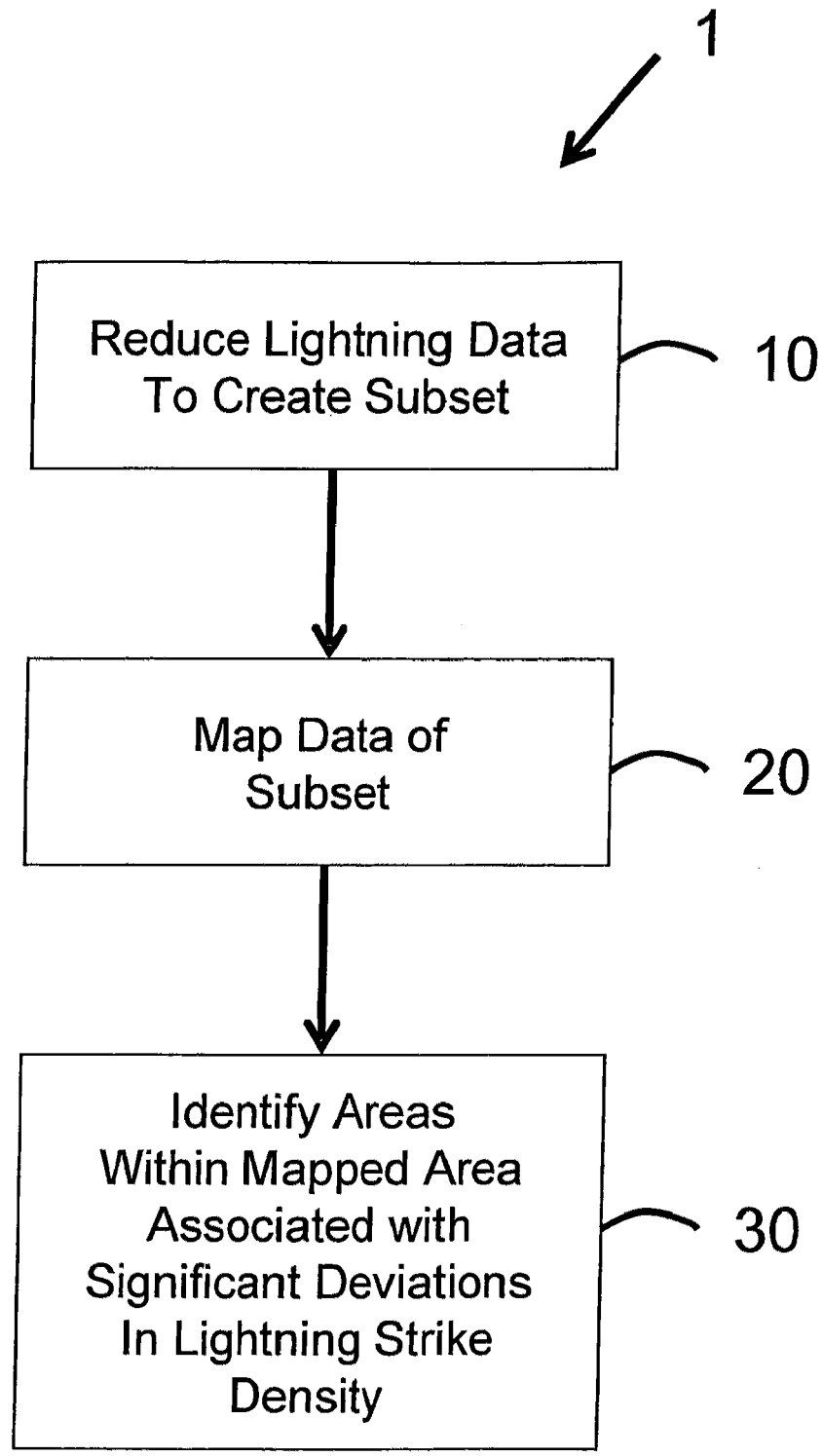
FIG. 6 is a flow chart of a preferred lightning strike data reduction methodology according to the present invention.

FIG. 6 is a flow-chart of the preferred reduction methodology (1). In a step 10, the lightning data are reduced to create the aforementioned first sub-set of lightning data; in a following step 20 the data of the subset are mapped; and in step 30 areas that are preferably within the mapped area, such as those defined by the aforementioned sliding window filter, are identified as being associated with important sub-surface natural resources as a result of having been determined to have associated lightning strike densities therein that are significant.

Figure 7:
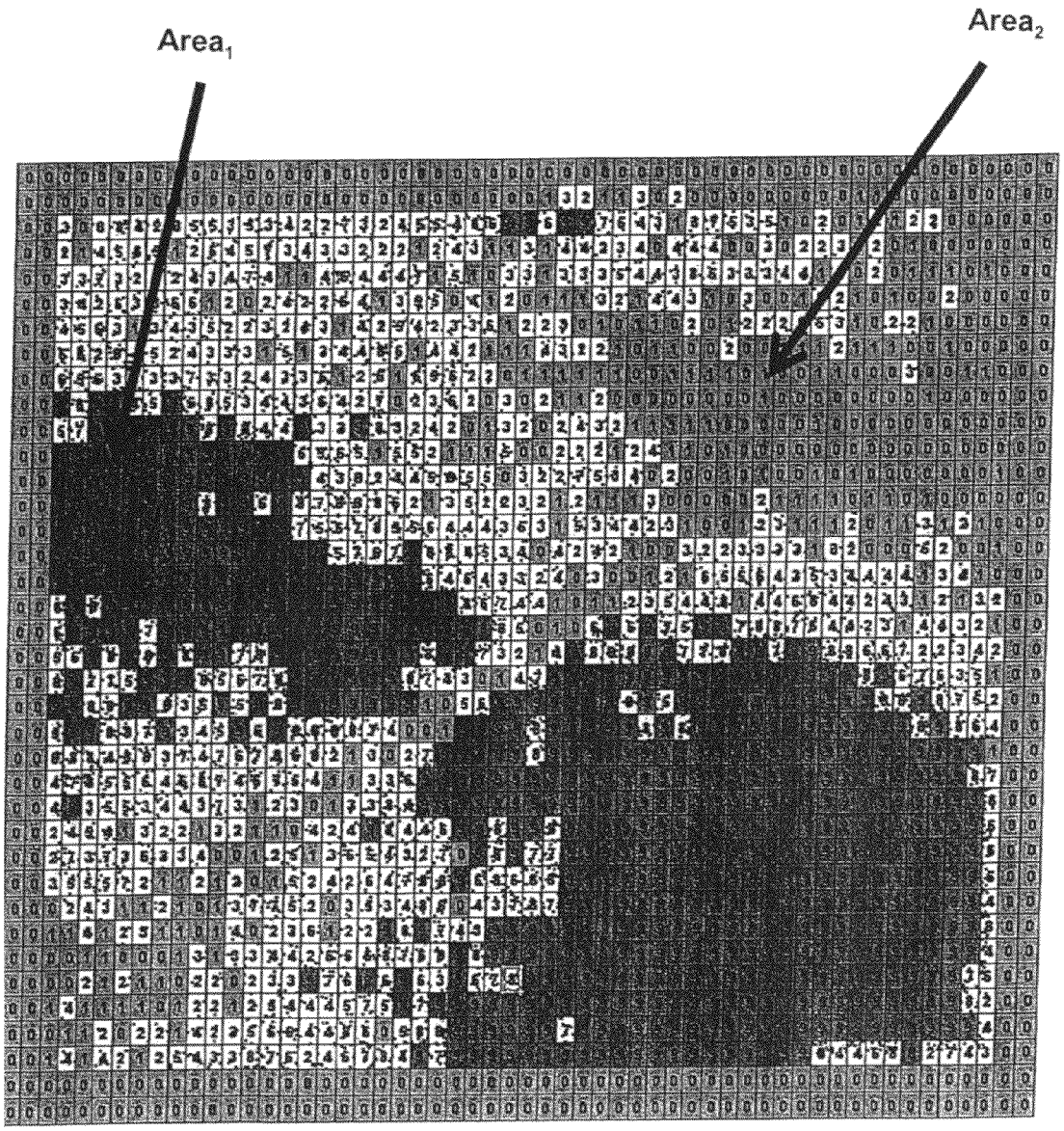
FIG. 7 is the map of FIG. 5 having identified thereon two areas of significant strike density by application of a method according to the present invention.

FIG. 7 is a map showing two areas identified by the sliding window filter as being of significant strike density; one area "Area$_1$" having been found to have associated therewith a relatively high strike density (9 or more strikes per cell), and another area "Area$_2$" having been found to have associated therewith a relatively low strike density (1 or no strikes per cell).

It is useful to perform this process with different combinations of the lightning parameters, to obtain a number of different patterns, which in totality are analogous to a signature that can be used to provide a more precise comparison with predetermined such signatures for known sub-surface geology.

Another example of reduction is to select lightning strikes that occur only at specific times, e.g., specific times of the day or year, or only at certain times relative to the earth tide. The present inventors have determined that, aside from the obvious seasonal dependence of lightning phenomena as a whole, lightning strike data vary differently between areas associated, and not associated, with natural resources depending on season, and depending on whether there is an earth tide. Seasonal lightning strike dependence is shown by the lack of lightning storms in northern latitudes where there is snow on the ground and a lack of atmospheric convection. The earth tide is a periodic cycle of change in the stress on the sub-surface geology due to changes in the influence of lunar gravity. This can lead to various geophysical effects, such as opening fractures and allowing natural gas and other vapors to escape and create an electrical channel for lightning leaders. The present inventors have found that, in North Dakota, there are about 15% more lightning strikes during times of high earth tide. It may be advantageous to select lightning strikes for the first database, in whole or in part, by choosing lightning strikes occurring during high earth tide.

Other measures, or factors, recognized by the present inventors that may advantageously be used as a basis, in whole or in part, in reduction filtration due to observed links with lightning strike propensity are topography, vegetation, soil moisture, soil type, bathymetry of water bodies, man made infrastructure and its proximity to the area of interest, ocean current data, sea surface temperatures, sunspot activity, solar winds, and other natural phenomena, both terrestrial and non-terrestrial.

It follows from the same recognition that it may be desirable to account or compensate for changes in lightning propensity due to such factors, if data for which such factors are known to differ are to be compared, or to otherwise ensure that for like data are used for comparison.

If filtration is performed according to the aggregation methodology (2) above, the lightning data preferably represent all the strikes in the lightning database (after cleaning and/or normalization). If a sub-set of the data is taken, the sub-set is preferably the same as the first sub-set described above. In that case, the results from reduction and aggregation should be comparable.

The "cells" mentioned above in connection with aggregation are divisions or fragments of the larger geographical area being searched. So, for example, a geographical area that is 15 kilometers by 20 kilometers may be divided into grid pattern of 300 cells that are each one square kilometer. Preferably, but not necessarily, the sum of the areas of the cells equals the total geographical area of interest. The static nature of the cells contrasts with the sliding windows described above in connection with the reduction methodology (1); however, cells and windows are preferably about the same size.

Cells are generally one of three types: (I) those whose boundaries or sizes are determined by known geological factors; (II) those whose boundaries are determined by other factors; and (III) those whose boundaries are determined arbitrarily. Typically according to the invention, the cells are of type (III) and are simply determined by defining a grid pattern within the geographical area of interest, such as in the example mentioned above.

A geographical area of interest can be divided in any number of ways. However, since lightning strikes worldwide, it is preferable to define a world-wide grid based on cells having equal latitude and longitudinal ranges. More particularly, it is preferable to utilize what are known as IG cells as defined by the readily available computerized processing tool marketed as "Infinite Grid$^{SM}$" by Walden 3-D, Inc. of Barker, Tex., U.S.A.

IG cells are defined as follows: 64 (8×8) "IG1" cells cover the surface of the earth, each IG1 cell having a longitude range of 45 degrees and a latitude range of 22.5 degrees; the IG1 cells in turn are each divided into 81 (9×9) "IG2" cells, each having a range of 5 degrees longitude and 2.5 degrees latitude; the IG2 cells are each divided into 25 (5×5) "IG3" cells, each having a range of 1 degree longitude and 0.5 degrees latitude; the IG3 cells are each divided into 64 (8×8) "IG4" cells, each having a range of 7.5 minutes longitude and 3.75 minutes latitude; the IG4 cells are each divided into 81 (9×9) "IG5" cells, each having a range of 5 seconds longitude and 25 seconds latitude; the IG5 cells are each divided into 25 (5×5) "IG6" cells, each having a range of 5 seconds longitude and 2.5 seconds latitude; the IG6 cells are each divided into 25 (5×5) "IG7" cells, each having a range of 1 second longitude and 0.5 seconds latitude; and the IG7 cells are each divided into 25 (5×5) "IG8" cells, each having a range of 0.2 seconds longitude and 0.1 seconds latitude.

To provide illustrative sizes of some important IG cells for purposes of the present invention, at North Dakota latitudes IG4 cells are 9,394 meters in longitude, 6,953 meters in latitude, and have areas of 65,311,785 square meters; IG5 cells are 1,044 meters in longitude, 773 meters in latitude, and have areas of 806,490 square meters; and IG6 cells are 207 meters in longitude, 155 meters in latitude, with areas of 32,012 square meters. The smallest cells relevant to this invention, IG8, are 8.35 meters in longitude, 6.18 meters in latitude, and have areas of 52 square meters, which is well below the current resolution of lightning strike data locations.

One reason for the preference for IG cells is simply that they conform to the USGS (United States Geological Society) map scale convention. However, a more fundamental reason is that IG cell sizes bear a close relationship to the actual sizes of the sub-surface geologies identified above, particularly the IG3-IG6 cells. The present inventors have recognized that it is helpful, though not essential, to use cell sizes of approximately the same dimensions as the sub-surface geologies for which users of the methodologies described herein are searching.

As in the sliding window technique described above, in a preferred aggregation methodology, the number of strikes within a cell is counted to obtain a strike density (strikes/cell area). This density can be compared to the densities of strikes in other cells, or it can be compared to a predetermined threshold. However, just as for the reduction methodology (1), the aggregation methodology (2) may identify significant cells by considering factors other than strike density.

In that regard, it may be noted that the "Infinite Grid$^{SM}$" process provides for making a number of calculations concerning the lightning strike parameters for the lightning strikes within a cell which also can be useful, such as the average, maximum, and minimum values of the lightning strike parameters, and the range of the lightning strike parameters. For example, the process can calculate the variation in lightning strike parameters over a specified time interval of, e.g., days, months, or years, or as a result of earth tides, sunspots, or the solar wind, or other natural phenomena that influence lightning strike propensity.

The present inventors have also recognized that it is useful to use standard mapping calculations common to geophysical exploration in conjunction with data filtration according to the invention. For this purpose, any of the following calculations may be made, in any combination or sub-combination: adding, subtracting, multiplying, or dividing a value associated with a map by a constant; adding, subtracting, multiplying, or dividing the map; applying edge detection algorithms; calculating curvature attributes (including Maximum Curvature, Azimuth of Maximum Curvature, Minimum Curvature, Most Negative Curvature, Most Positive Curvature, Curvedness Calculation, Dip Curvature, Gaussian Curvature, and Strike Curvature), Principle Component Filter, Lineament Delineation; Structure Oriented Mean Filter, Structure Oriented Mean Filter, Structure Oriented Median Filter, Dip Azimuth, Cross-Line Apparent Dip, In-Line Apparent Dip, Dip Magnitude, Cross-Line Energy Weighted Amplitude, In-Line Energy Weighted Amplitude, Bowl Attribute, Dome Attribute, Ridge Attribute, Shape Index Calculation, Saddle Attribute, Valley Attribute, Measure of Confidence Dip, Derivative of Total Energy, Coherent Energy, Total Energy in Centered Window, Coherent Total Energy Ratio, applying spatial filters to maps, taking the first or second derivatives of the map with respect to distance, etc. Of course, any such calculations can be made without the assistance of a particular process or software package.

Figure 8:
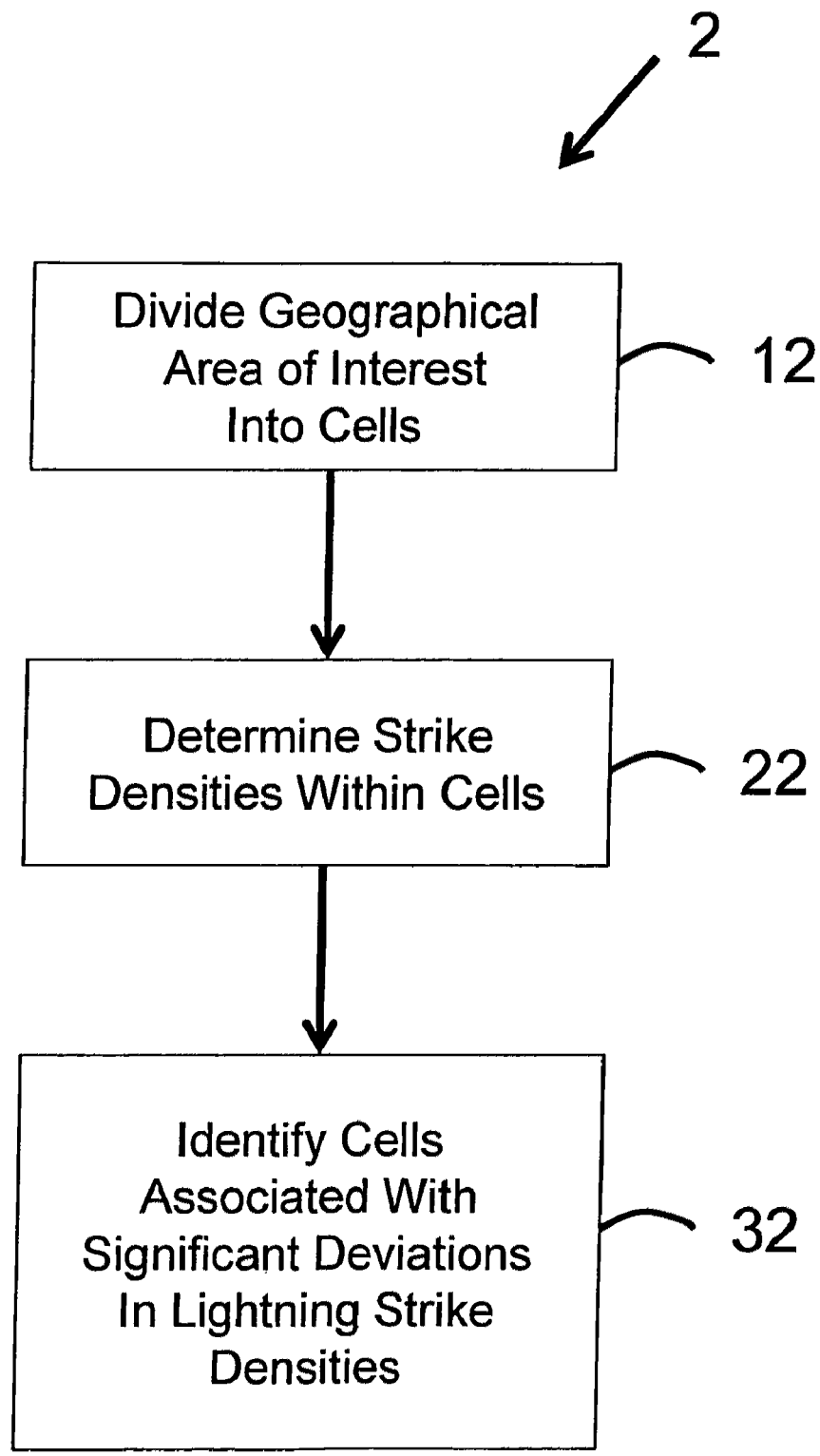
FIG. 8 is a flow chart of a preferred lightning strike data aggregation methodology according to the present invention.

FIG. 8 is a flow-chart of the preferred aggregation methodology (2). In a step 12, a geographical area of interest is divided into cells; in a following step 22 the strike densities, averages, or other strike attributes are determined within one or more of the cells; and in step 32 cells are identified as being associated with important sub-surface natural resources as a result of having been determined to have associated lightning strike densities therein that are significant.

It has also been found to be useful to modify the strike density or other calculated results determined for a cell by similar calculated results determined for neighboring cells. For example, assume a 3×3 cell matrix having a center cell and eight surrounding nearest neighbor cells. It has been found to be useful to assign to the center cell a calculated result that is a weighted average of the calculated results for the nine cells, wherein the results for the center cell are weighted more heavily than the results for the remaining eight cells. The method can be extended to include cells farther from the center cell (e.g., next-nearest neighbor cells), with correspondingly lower weights. The Infinite Grid$^{SM}$ process also provides this capability, but again, it is not necessary to use a particular process or software package.

Generally, the IG6-IG7 sizes of the IG cells mentioned above are believed to provide an optimum resolution for revealing important patterns in lightning data processed according to the invention. However, the present inventors have seen important patterns at larger cell sizes, corresponding to larger geological scales. Such cells, being related to geological scales, generally fall within the aforementioned cell type (I), i.e., those whose boundaries or sizes are determined by known geological factors.

In this connection, it may be noted that the fourteen above-identified geological features, insofar as they are associated or potentially associated with desirable natural resources, can be generally referred to as "Prospects." Prospects correspond generally in size to IG5 cells. "Play Fairways" represent a quantum increase in scale, corresponding generally in size to IG4 cells. "Basins" represent another quantum increase in scale, corresponding generally in size to IG3 cells. Accordingly, within a Basin there may be multiple Play Fairways, and within a Play Fairway there may be multiple Prospects. The present inventors have seen significant patterns in lightning data at each of these larger cell sizes.

As mentioned above, the lightning database preferably includes a waveform record of the lightning strikes. More particularly, the amplitude of the current associated with a lightning strike is preferably recorded as a function of time by the lightning detection and data collection network 10. The record is typically not continuous; rather, it is typically sampled at regular intervals, between the time the current first begins to rise from zero, during the time the current is greater than zero, and until the time the current falls back down to zero. It has been noted by the present inventors that the corresponding waveforms are, like the mapped strike data discussed above, indicative of underlying geology.

It has been known that seismic data may be used in conjunction with well log data to "invert" the seismic data to indicate resistivity. The well log data are used iteratively to "guide" the inversion. The result is a better spatial extrapolation of resistivity than the well log data alone provide. The resistivity measurement is used to identify the sub-surface geology.

According to the present invention, waveform data are inverted using the same known techniques used to invert seismic or electromagnetic (e.g., CSEM) data, using either or, preferably, both well log and seismic data as guides, to transform the waveform data into equivalent resistivity data. Inversion of the lightning waveform defined by a powerful lightning strike, guided by well and seismic data for the area, creates a low resolution trace equivalent to a resistivity log, referred to below as a lightning resistivity trace ("LRT"). This inversion provides a basis for predicting the depth of the sub-surface natural resource, particularly at the scales of Prospects, Play Fairways, and Basins. Since lightning strikes occur almost everywhere, using lightning data as an exploration reconnaissance tool is much less expensive than either drilling a well or collecting a 2-D or 3-D reflection seismic survey.

Where lightning strikes occur at locations where well data and/or seismic data are not available, the nearest "control" data can be used. If the control data are associated with similar geological features, this will not result in significant loss of accuracy.

More specifically, the control data is preferably obtained for an area or territory that, at least, falls within the same Play Fairway as that of the lightning strike(s) used for inversion. Alternatively, a comparison can be made between territories that fall within different Play Fairways, which may be arbitrarily far apart, that have comparable geology. Whether two areas have comparable geology can be identified by whether they provide similar data in response to geological or geophysical measurements, such as aeromagnetic data, geopressure data, geothermal data, geologic outcrop data, well log data, salinity data, geochemical data, sulfide data, mining data, etc. It may be advantageous to consider two areas to be comparable with regard to particular choices of such data, i.e., two areas may be comparable in terms of geopressure data but not geologic outcrop data, or other data, and the two areas may still be considered comparable for purposes of the invention.

Preferably, the waveform data provide a representation of the lightning over a "full" period measured from the time of first rise of the current from zero, to the time of first fall of the current to zero. However, it is believed that useful results may be obtained if waveform data representing only the time range from peak to zero are utilized.

In the same way that multiple seismic traces can be added together (or "stacked") to increase the signal-to-noise ratio, lightning resistivity traces for multiple lightning strikes in an area, e.g., an IG7 cell, can be stacked to produce an enhanced LRT.

Preferably, there are well logs or seismic traces for the same area in which the LRT is effective, so that the well logs or seismic traces can be used to guide the inversion. However, this is not essential; the seismic or well log data may be associated with other areas having similar lithologies and fluids, or otherwise having a sufficient geological nexus with or similarity to the area.

Lightning resistivity traces for two or more points defining, substantially, a line can be used to create one or more 2-D cross-sections, and LRTs provided for three or more points or locations defining an area can be used to create one or more 3-D volumes.

As mentioned above, a lightning resistivity trace provides for determining the depth (or "top/base") of the sub-surface geology, and the LRT cross-sections and LRT volumes provide, respectively, for determining the lineal and volumetric extent ("topography") of the sub-surface geology. This determination is made by interpretation; particularly, by comparison with comparable data obtained either for the area, or for an area or areas with which the given area has a sufficient geological nexus or similarity. Examples of such comparable data include the seismic and/or well log data used to guide the inversion, as well as geologic sections, cross-sections and volumes derived from outcrops, well logs, 2-D seismic sections or 3-D seismic volumes, gravity profiles, aeromagnetic profiles, or any combination or sub-combination of the foregoing. The LRT cross-sections and volumes can also be used more generally to obtain a "view" of the sub-surface geology.

Preferably, a reduction is applied to the lightning strikes within an area of interest as described above, to select lightning strikes to be used for obtaining the LRT(s), but this is not essential.

It should be understood that exploration methodologies according to the present invention are not intended to be exclusive. The best results are usually obtained when multiple data sources are consulted and multiple interpretive methodologies are employed. Therefore, methods according to the present invention are preferably employed in conjunction with other methods, standard or non-standard, existing or yet to be developed, the results being both compared and contrasted. However, methods according to the present invention can be employed exclusively to useful effect if desired.

After identifying target areas under which, or associated with which, important natural resources are likely to be found, methods according to the invention preferably include taking some action in connection with the area or areas. For example, as a result of determining that a certain area is associated with important natural resources, maps may be updated and records changed to reflect the discovery. It might be decided that the area should be protected, and actions can be taken toward that end, such as cordoning off or guarding the area. Typically an invasive step is performed, such as excavating, drilling, or mining in the area or in surrounding areas, either to explore further or to extract the natural resource. Another example of an invasive step is the construction of a structure, such as a fence or derrick.

One specific example of how predictions provided by the present invention can be used is in a methodology for ranking territories, such as mineral lease territories, for which there may be no or insufficient data regarding the existence of important sub-surface natural resources. The methodology starts with the identification of a control territory, which is a territory for which there is an existing map of the sub-surface deposits that is known to be good. This provides a valid basis for comparison if there is a sufficient geological nexus between the control territory and the territory to be evaluated or ranked. The same considerations mentioned above in connection with inversion apply, for determining the sufficiency of this nexus.

A map of lightning strike data preferably obtained by the reduction methodology (1) as described above is overlaid on the map of known sub-surface deposits for the territory, by dividing the two maps into grids of identical corresponding cells, preferably IG6 or IG7 cells or other cells within a similar range of size.

The cells of the two maps can, of course, be overlaid to define a single cell for a given area within the territory. In view of this equivalence, a corresponding pair of cells that define a single resulting cell will be referred to as a single "control cell" for convenience with no loss of generality, and the combination of the two maps can be considered to define a single "control map" in which one of the maps overlies the other.

For the area within a cell of the control map, it is desired to determine two numbers or values, a first value or number representing the degree of presence or absence of the known sub-surface deposits corresponding to the control cell, and the second number or value representing the density (or some other measure of the degree or significance) of the lightning strikes corresponding to the cell.

The difference in these two numbers for a given control cell provides a measure of a first correlation between the lightning strike data and the known sub-surface deposit data for the cell. The first correlation measurements for a desired aggregate of the control cells can then be summed to create a single number indicative of the overall correlation between the lightning strike data and the known sub-surface deposits for the control map.

Territories for which there are no existing maps showing sub-surface deposits can be usefully compared to the control map. Consider a particular territory in question that, for example, either lacks known sub-surface deposits, or for which existing sub-surface deposit maps may be incomplete or incorrect. A geographical map of this territory is divided into a grid of cells of the same size(s) used to divide the control map. Lightning strike data obtained in the same manner as the lightning strike data used for evaluating the control territory is provided on this map, defining a "subject map" (with the cells thereof being referred to below as "subject cells").

In the subject map, there will be at least a subset of the subject cells that correspond one-to-one with the cells of the control map. These are the subject cells that are available for comparison between the two maps ("subject comparison cells").

Values or numbers representative of the lightning data are preferably defined and determined for the subject comparison cells in the same manner as such values or numbers are determined for the control cells of the control map, to allow for direct comparison between the subject map and the control map. However, it will be readily appreciated that it is possible to compare values or numbers that are not defined or determined in the same manner, by accepting more error or by compensating for such error.

The lightning related values or numbers of the comparison cells of the subject map can be compared to the lightning related values or numbers of the corresponding comparison cells of the control map, and for each comparison cell, a second correlation can be measured that represents how closely the lightning related values or numbers compare between the subject map and the control map. Also, an overall second correlation can be determined for comparison with the aggregate control cells of the control map by adding together the value or values for a comparable aggregate of the subject comparison cells.

The second correlations link the lightning strike data for the subject territory and the lightning strike data for the control territory, and the first correlations link the lightning strike data for the control territory to sub-surface deposit information. Therefore, the two correlations taken together provide a link between the lightning strike data for the subject territory and sub-surface deposit information. The two sets of correlation information can be combined or more generally utilized in any number of different ways to realize this linkage as will be readily appreciated.

While there will generally be room for error in any single assessment of the likelihood that a particular subject territory includes or is associated with the sub-surface deposits of the control territory, there will in general be less error in making comparative assessments between different subject territories, such as for the purpose of ranking them for the likelihood that given sub-surface deposits are in fact present within, or are otherwise associated with, the territory.

It is believed to be an important recognition of the present inventors that lightning preferentially strikes an area, or preferentially avoids striking an area, based on underlying geology, which is generally fixed within human time scales. The inventors have therefore recognized that maps of the distribution of lightning strikes will have a static component, i.e., geographical areas that show either a relatively high or relatively low number of lightning strikes, or anomalies in lightning parameters, should continue to be areas over which it is either relatively likely or relatively unlikely that lightning strikes, particularly very high power lightning strikes, will occur in the future. Therefore, some exemplary practical applications of methods according to the invention are to identify areas over which airplanes may advantageously choose to avoid flying, and areas over which it may be more important to install lightning rods, such as a golf-course located in an area associated with which there are anomalies in the number of lightning strikes, or in the lightning parameters.

Though it is not essential, methods according to the invention preferably include a "calibration" step, in which the method is applied to map lightning data associated with one or more areas of known sub-surface geology and/or known sub-surface natural resource deposits. The calibration step can provide for both qualitative and quantitative interpretations of a map obtained by the method for an area or areas having sub-surface geology that is either unknown or only partially known.

If the sub-surface geologies of the known area and a new area being studied are comparable, the maps should show comparable patterns in the filtered lightning data. The maps can be correlated by use of any standard technique, and a degree of correlation, between a map or maps of areas with known sub-surface geology and a map or maps of areas being searched, can be determined.

If the degree of correlation is high, then it may be qualitatively inferred that the sub-surface geology of the areas associated with the two sets of maps is similar. Moreover, where the correlation is especially high, parameters such as depth and size of the sub-surface geology, as well as vertical and horizontal offsets, may be quantitatively inferred.

Also though it is not essential, it is often advantageous to perform what is known in the mathematical arts as polytopic vector analysis ("PVA") on the lightning data, or on a cleaned sub-set thereof, to obtain hybridized lightning parameters for use in the mapping methodology described above.

A sub-set such as obtained by data reduction as described above, or an entire set of the lightning strikes in an area may be selected. The lightning strikes have associated lightning parameters, e.g., A1-A14 noted above. The parameters define an "n" dimensional sample space, where "n" is the number of parameters. A first step in the PVA process is to determine whether there is an "m" dimensional "type" space where n>m into which the "n" dimensional samples can be resolved without significant loss of information.

For example, if there are 5 lightning parameters, but one of the lightning parameters correlates well with one of the other lightning parameters, then an m=4 dimensional "type" space exists into which the n=5 dimensional samples can be resolved without significant loss of information. The lack of significant loss of information can be checked by recovering the original data by back-calculation.

The "n" dimensional samples are resolved into "m" dimensions by projecting them into the "m" dimensional space. More specifically, the "m" dimensions of the type space define m+1 vertices of a regular geometric body or form referred to as a polytope. For example, in a two dimensional (2-D) type space, the polytope is a triangle, and in a 3-D type space, the polytope is a tetrahedron. The "n" dimensional samples are projected into the space enclosed by the polytope, and a condition is imposed that the vertices of the polytope are "sample-like" values, i.e., values that could correspond to real data. Preferably, the polytope is oriented to accomplish this containment with a minimum size.

Each projected sample can be specified as a linear combination of the sample-like vertices M of the polytope, obtained by interpolation. Thus, the projected samples can be specified as being various percentages of a mixture of attributes defined by the vertices M.

The vertices M define respective coordinate values. More particularly, each vertex M defines an extreme value of a coordinate in the "m" dimensional space. As an example, in a 3 dimensional Cartesian type space where M is specified as (0, 5, 0), M defines an extreme value of y=5, which would then be the maximum value of y for any of the projected samples. As noted, each projected sample can be specified as a linear combination of the vertices M. So each projected sample has a value that is a first amount "$A_1$" of a first vertex M1, a second amount "$A_2$" of a second vertex M2, ... and an $m^{th}$ amount $A_m$ of the $m^{th}$ vertex $M_m$, where $A_1+A_2+\ldots A_m$ may be conveniently taken as 1. The $A_{1-m}$ coordinate values for the projected samples define ranges for each $A_m$. For example, the $A_2$ coordinates for all the projected samples in the 3-D Cartesian type space example above will vary within the range 0 and 5.

These coordinates are, up to this point, mere mathematical constructs, but they can be linked to a geophysical reality by correlating them with geological and geophysical maps. For example, a map of faulting may be obtained for the area, and it can be noted whether and to what extent a high or low value of a coordinate (e.g., $A_2$) correlates with the degree of faulting. This allows a searcher to identify a relationship between the sub-surface geology and the vertices M. For example, it may be determined from the projected samples that only one of the vertices M is an important indicator of the sub-surface geology, and as a more specific example, it may be determined that the correlation is specifically an inverse relationship.

The correlations found for the "m" dimensional type space can be related to the original samples in the "n" dimensional sample space by reverse projection. Thus by exercise of this PVA method, particular lightning strikes can be identified as being particularly indicative of a particular sub-surface geology.

More specifically, PVA results in the identification of "hybrid" lightning parameters that are mixtures of the existing (or "pure") lightning parameters such as the parameters A1-A14 listed above that can be obtained directly from the lightning database. For example, a pure lightning parameter may be A5, or peak current, whereas a hybrid lightning parameter determined by use of PVA may be 80% A5 and 20% A9, or rise time. These hybrid lightning parameters determined by PVA can be used to play the same role in the mapping methodology described above as the pure lightning parameters, and have been found to provide increased contrast between areas associated with which important sub-surface natural resources can be found, and areas not associated with such resources.

In the PVA process, a hybrid lightning parameter can be formed by mixing lightning parameters with non-lightning parameters. For example, a hybrid lightning parameter may represent a mixture of 50% peak current and 30% rise time, and 20% Bouguer gravity as measured at or near the location of the strike. Some other examples of non-lightning parameters that can be used in PVA processing according to the invention are magnetic field, soil moisture, and types of vegetation.

It is to be understood that, while specific methods for locating natural resources have been shown and described as preferred, other methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for locating a sub-surface natural resource by use of lightning data for each of a plurality of lightning strikes, the method comprising:
   determining from the lightning data, for each of the plurality of lightning strikes, one or more respective lightning parameters A associated with the lightning strike, and at least one respective location B determined for the lightning strike;
   filtering the lightning data, including selecting a sub-set of said plurality of lightning strikes, said step of selecting including a step of comparing, for each of said plurality of lightning strikes, the corresponding one or more lightning parameters A of the lightning strike with either or both (1) the lightning parameters A associated with the remaining others of said lightning strikes, and (2) one or more standards of comparison;
   identifying, for each of the lightning strikes of said sub-set, the corresponding locations B;
   associating the lightning strikes of said sub-set with the corresponding locations B to define a mapped area;
   determining, for at least one first geographical area of said mapped area, one or more first measures relating to one or more of (1) a quantity of the lightning strikes of said sub-set falling within said at least one first geographical area, and (2) one or more of the lightning parameters A associated with the lightning strikes of said sub-set falling within said at least one first geographical area; and
   identifying said at least one first geographical area as corresponding to at least one target geographical area associated with which the natural resource is relatively likely to be found, at least in part, as a result of determining that said one or more first measures is significant.

2. The method of claim 1, wherein said step of determining that said one or more first measures is significant includes comparing said one or more first measures to one or more corresponding significance standards.

3. The method of claim 2, wherein said step of determining that said one or more first measures is significant includes determining that said one or more first measures either exceeds a first significance standard or falls below a second significance standard.

4. The method of claim 1, further comprising a step of determining, for at least one second geographical area distinct from said at least one first geographical area, one or more second measures relating to one or more of (1) a quantity of the lightning strikes of said sub-set falling within said at least one second geographical area, and (2) one or more of the lightning parameters A associated with the lightning strikes of said sub-set falling within said at least one second geographical area.

5. The method of claim 4, wherein said step of determining that said one or more first measures is significant includes comparing said one or more first measures to one or more corresponding significance standards, the method further comprising determining said one or more significance standards at least in part by the result of said step of determining said one or more second measures.

6. The method of claim 1, wherein said step of determining that said one or more first measures is significant includes comparing said one or more first measures to one or more corresponding predetermined significance standards.

7. The method of claim 1, wherein said step of comparing includes comparing, for each of said plurality of lightning strikes, the corresponding lightning parameter A with the lightning parameters A associated with the remaining others of said plurality of lightning strikes.

8. The method of claim 1, wherein the one or more lightning parameters A include at least one of A1, a date associated with the lightning strike; A2, a time associated with the lightning strike; A3, a latitude associated with the lightning strike; A4, a longitude associated with the lightning strike; A5, a peak current associated with the lightning strike; A6, a Chi-square associated with the lightning strike; A7, a semi-major axis associated with the lightning strike; A8, a semi-minor axis associated with the lightning strike; A9, a rise time associated with the lightning strike; A10, a peak-to-zero time associated with the lightning strike; A11, a number of lightning sensors associated with the lightning strike; and A12, a polarity associated with the lightning strike.

9. The method of claim 8, wherein the one or more lightning parameters A includes A5.

10. The method of claim 9, wherein said step of comparing includes comparing, for each of said plurality of lightning strikes, the corresponding lightning parameter A5 with the lightning parameters A5 associated with the remaining others of said plurality of lightning strikes.

11. The method of claim 1, wherein said step of selecting said sub-set includes associating, with each of said plurality of lightning strikes, respective contemporaneous occurrences of one or more physical phenomena, and choosing at least some of the lightning strikes for said sub-set at least in part as a result of said occurrences.

12. The method of claim 11, wherein said one or more physical phenomena include at least one of high earth tide, low earth tide, high sunspot activity, low sunspot activity, high solar wind activity, and low solar wind activity.

13. The method of claim 1, further comprising defining a plurality of geographical cells within a geographical area that contains said locations B, and, for the lightning strikes occurring within each cell, respectively aggregating the corresponding one or more first measures.

14. The method of claim 13, wherein said step of determining said one or more first measures includes determining a quantitative representation of the lightning strikes in at least one of said cells, and wherein said step of identifying said at least one target area includes comparing said quantitative representation to at least one corresponding quantitative standard.

15. The method of claim 1, wherein there are a plurality of respective lightning parameters $A_1, A_2, \ldots A_n$ associated with the lightning strike, each lightning parameter $A_n$ corresponding to "n" respective orthogonal coordinate axes of an "n" dimensional measurement space, the method further comprising:

projecting the set of lightning parameters $A_n$ into an "m" dimensional space defined by "m" orthogonal coordinate axes $M_m$, where "m" and "n" are integers and "m" is less than "n," to obtain a set of projected parameters $A_m$ corresponding to the set of lightning parameters $A_n$;

identifying a polytope within the "m" dimensional space that encloses the projected parameters $A_m$, the polytope having "m"+1 vertices M, the vertices M each having a set of coordinate values corresponding to the coordinate axes $M_m$;

resolving each of the projected parameters $A_m$ into linear combinations of the coordinate values of the vertices M; and utilizing said projected parameters $A_m$ as the lightning parameters A in the remaining steps of the method.

16. The method of claim 15, wherein said step of identifying includes requiring that the polytope satisfy the condition that the coordinate values of the vertices M, when reverse projected into the "n" dimensional space, correspond to allowed coordinate values for the parameters $A_n$.

* * * * *